United States Patent [19]

Dede et al.

[11] Patent Number: 5,775,723
[45] Date of Patent: Jul. 7, 1998

[54] EXTRUDED AIRBAG RETAINER

[75] Inventors: Carsten Dede, Roisdorf, Germany; Thomas B. Branski, Glendale, Ariz.

[73] Assignee: VAW Aluminium AG, Bonn, Germany

[21] Appl. No.: 619,915

[22] Filed: Mar. 20, 1996

[30] Foreign Application Priority Data

Mar. 31, 1995 [DE] Germany ............ 195 12 378.6

[51] Int. Cl.⁶ .................................. B60R 21/16
[52] U.S. Cl. .......................... 280/728.2; 280/732
[58] Field of Search .................. 280/728.1, 728.2, 280/732, 739

[56] References Cited

U.S. PATENT DOCUMENTS

| 4,941,678 | 7/1990 | Lauritzen et al. | 280/732 |
| 5,342,082 | 8/1994 | Kriska et al. | 280/728 A |
| 5,482,313 | 1/1996 | Ikeya et al. | 280/728.2 |
| 5,505,484 | 4/1996 | Miles et al. | 280/732 |
| 5,533,747 | 7/1996 | Rose | 280/728.2 |

FOREIGN PATENT DOCUMENTS

| 4016681 | 5/1990 | Germany. | |
| 2-306846 | 12/1990 | Japan | 280/728.2 |
| 2265337A | 9/1993 | United Kingdom. | |
| WO91/14110 | 9/1991 | WIPO. | |

OTHER PUBLICATIONS

Hutte Engimeers Workbook, Ernst & Son, Berlin (1971 pp. 136–139.

Handbuch de Schweisstechnik, Springer–Verlog, Berlin (1980). Band I. p. 36.

*Primary Examiner*—Eric D. Culbreth

[57] ABSTRACT

An extruded metallic housing or retainer for containing and supporting an inflatable airbag behind the dashboard of a vehicle. The curved retainer has ends or legs, adjacent the dashboard, at least one of which is weakened along a narrow transverse area by heat treatment and/or reduced wall thickness. Occupant impact against said leg is cushioned by the bending or flexing of the leg along the weakened area.

7 Claims, 3 Drawing Sheets

EXTRUDED AIRBAG RETAINER

BACKGROUND OF THE INVENTION

FIELD OF THE INVENTION

This invention relates to a passive airbag restraint system for use in a motor vehicle for restraining a seated occupant during a collision. More particularly, it relates to an improvement in the structure of the airbag retainer or housing to reduce the potential for head injuries during accidents at speeds at which the air bag does not inflate.

The airbag housing or retainer of a vehicle passive restraint system provides support for the gas generator and the inflatable bag until the bag deploys. An airbag retainer or housing is normally formed of a trough-shaped sidewall which may be extruded and cut to the desired length. The opposed ends of the sidewall are closed by end plates screwed thereto, which may be flat aluminum sheets or may be extruded to reduce the amount of machining required. An example of a reaction housing or canister in accordance with the prior art is disclosed in U.S. Pat. No. 4,941,678 of Lauritzen, et al.

The reaction retainer or housing of the restraint system is normally positioned behind the instrument panel of a vehicle. The leading edges of the sidewall of the reaction canister may be within one inch, and sometimes closer, to the surface of the instrument panel. In the event of a low speed accident without bag deployment, a person's head or other body part may make impact with the instrument panel and drive it against an edge of the reaction canister. Not only can this cause injury to the vehicle occupant, but it can also cause failure to meet standards imposed by the National Highway Safety Administration.

One approach to solving this problem has been to form the sidewall ends or legs with corrugations and/or punched-out areas or slots, and to form the end plates with slots and cut-out areas, to provide airbag retainers or housings which are weakened and collapsible upon impact, and reference is made to U.S. Pat. No. 5,342,082 for its disclosure of such a system. This design has helped to soften the leading edges of the sidewall but has also unduly weakened the canister. It also creates potential snag points for the bag.

In order to optimize occupant protection it is necessary to provide an airbag retainer or housing system which is sufficiently yieldable upon passenger impact with a dashboard to cushion the impact and reduce the possibility of injury, while not interfering with or reducing the ability of the airbag to be deployed and inflated by the gas generator under the effects of activation impacts. The present invention is especially relevant when the passenger safety belt is not used and with a delayed impact which is below the deployment speed of the airbag system. Because of the limited space that exists in the vicinity of the dashboard, only slight spatial and material variation possibilities are available. The object of the present invention is, under the above-mentioned limited space conditions, to provide a technically simple but highly effective design for an extruded airbag retainer or housing, which ensures optimum occupant protection under the effects of impact below one which causes activation or deployment of the airbag.

SUMMARY OF THE INVENTION

The novel extruded airbag retainers or housings of the present invention are improvements over conventional extruded airbag retainers having a trough-shaped sidewall and opposed end plates, and the improvement is characterized by at least one of the two legs, which form the leading edges of the sidewall, being formed with a narrow elongate section of reduced strength providing a weakened localized area, across the width of the leg(s) of the sidewall, which yields, deflects or bends to cushion the impact of a passenger against a dashboard section overlying the contained airbag.

Preferably the weakened localized elongate narrow areas of the leg(s) of the sidewall are produced by a localized heat-treatment and/or by a localized reduction in the wall thickness of the sidewall leg(s), to provide the preferentially-yieldable narrow areas while not otherwise reducing the strength of the extruded airbag retainer or introducing slots, cut-outs or other edges which might snag or otherwise interfere with the normal deployment of the airbag.

THE DRAWINGS

FIG. 1 is a perspective view of an extruded airbag retainer sidewall portion as installed within a dashboard, illustrating the direction of force applied by a passenger impact, and the plane of such a force, FIG. 2 is a magnified cross-section of a portion of the sidewall of FIG. 1, illustrating the localized narrow weakened area of a leg portion, and FIG. 3 is a perspective view of an extruded airbag retainer sidewall portion according to another embodiment of the present invention, illustrating attachment to an airbag module cover or cross-car beam, within a dashboard, and further illustrating the direction of energy absorption under load.

DETAILED DESCRIPTION

Figure 1:
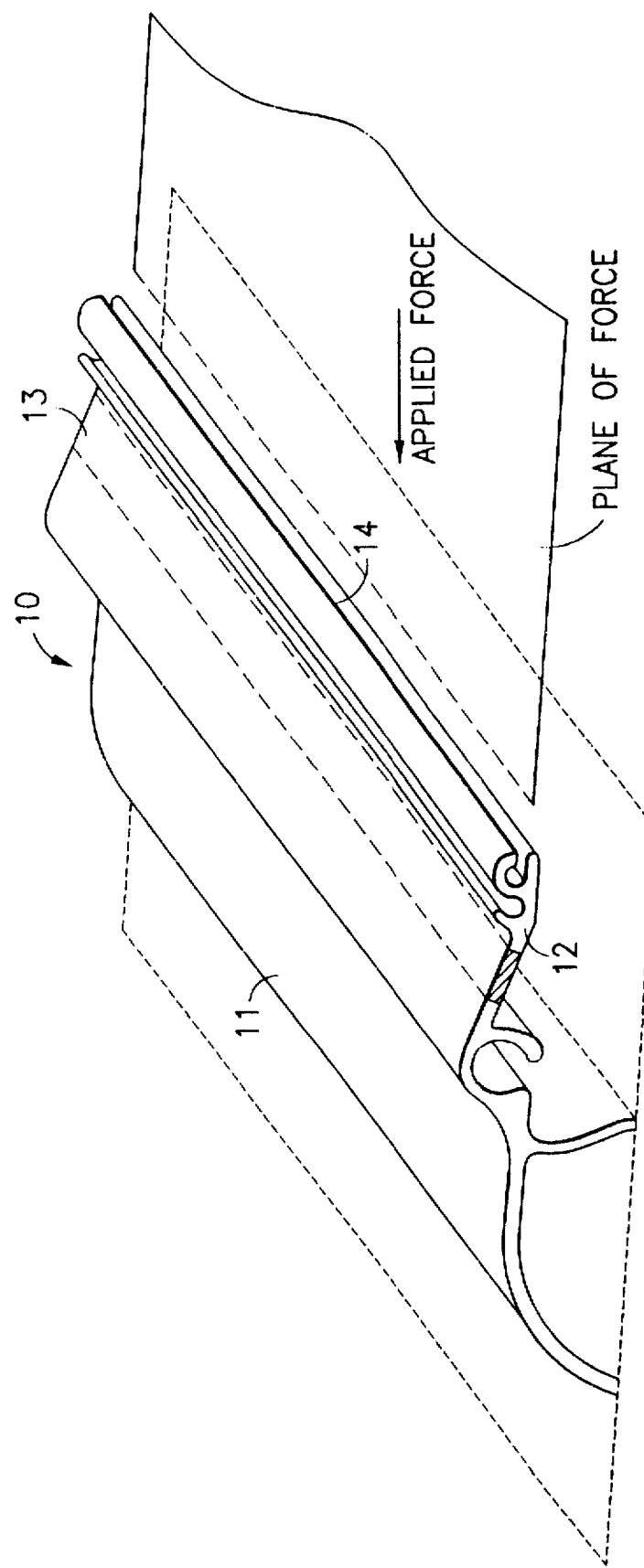

FIG. 1 of the drawings illustrates the upper half of an extruded metal airbag retainer 10 in a perspective view. A detailed partial airbag retainer is represented, consisting of a trough-shaped sidewall 11 with at least two opposed ends or legs 12, with the lower extrusion leg not being visible below the dashed sectioning plane. Reference is made to U.S. Pat. No. 5,342,082 for the further, conventional design of an extruded airbag retainer which can be provided with localized weakening of the leg portions thereof by application of the present invention.

Figure 2:
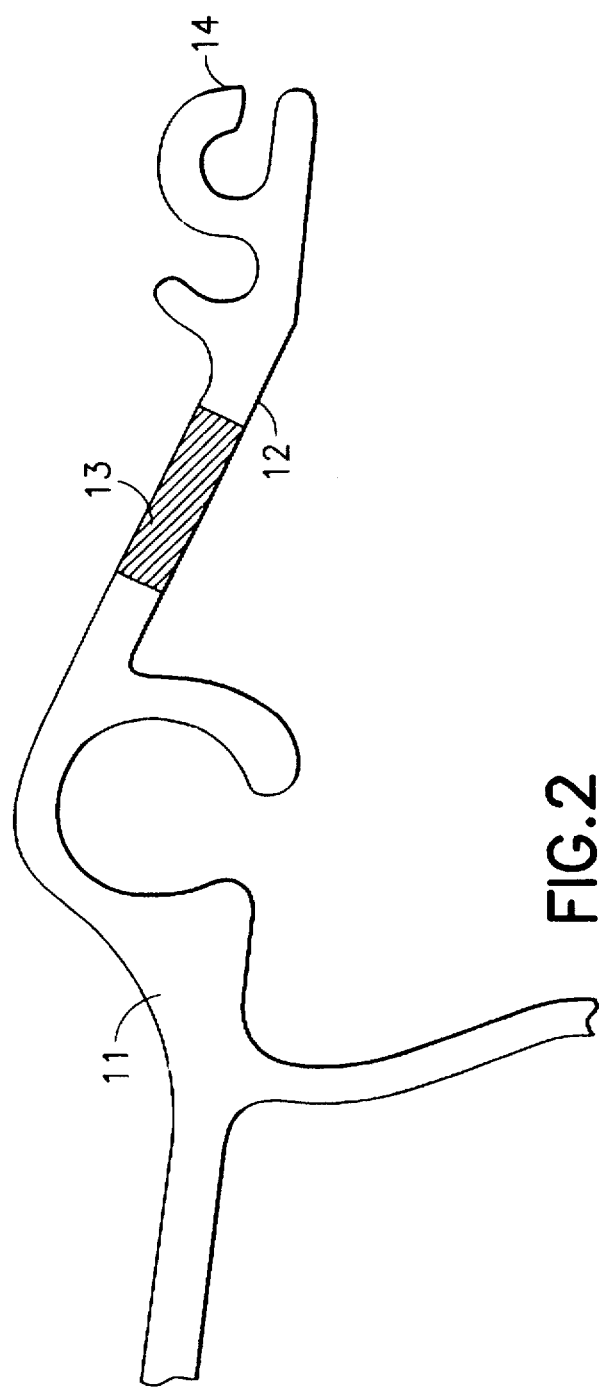

Extrusion leg 12 of FIG. 1 is shown enlarged in FIG. 2.

The preferred method according to the present invention for improving the ability of the leading edge 14 of at least the upper leg 12 to absorb impact consists in altering the strength of the leg(s) 12 by localized heat treatment to form narrow, elongate weakened leg area(s) 13 such as by annealing, either by induction or by means of a conventional burner. This produces a heat-influenced zone or area 13 across the width of the leg(s) 12 in which a recrystallized metal structure is formed that can be deformed, bent or flexed more easily.

For example, a narrow heat-influenced zone or area 13 measuring 3–4 mm in width can be produced in an aluminum alloy such as an AlMgSi alloy by raising the temperature of area 13 of leg 12 to about 420° C. for 30 seconds by means of an inductor, and then cooling it slowly. The resultant recrystallized alloy structure is especially able to absorb impact, and the external contour of the extruded airbag retainer remains visibly unchanged, as illustrated by FIG. 2, but is physically weakened to impart bend or flex areas 13 across the width of the leg(s) 12 to cushion an impact against a leading edge 14 in the direction of applied force.

By virtue of the design of a localized heat-influenced narrow transverse zone or area 13 according to the invention, increased absorption of force applied against edge(s) 14 results when the extrusion leg 12 is bent or flexed. The extrusion leg 12 which is normally rigid in the force application direction/impact direction is designed so that the force is absorbed along a plurality of "action planes" by weakened area 13. The "action planes" are the shape planes of the extrusion leg or legs 12, as illustrated by FIG. 1.

This means that, when the airbag is not deployed, a force acting on the extruded retainer 10, against the leading edge 14 of the extrusion leg 12, is deflected and the energy thus developed is converted into deformation energy. Thus, a deformable extrusion zone or area 13, produced by heat treatment and structural design can, when the seat belt is not used or the triggering speed of the airbag system is not reached, serve as a fully effective protection for occupants. The requirement for sufficient strength during assembly and installation as well as deformation when the airbag is activated are also met, as well as the structural requirements regarding installation within the narrow confines of a dashboard.

According to another embodiment of the invention, the narrow elongate weakened area 13 of one or both of the extruded legs 12 can be formed by making said area thinner in cross-section than the remainder of the wall of the leg(s) 12, particularly the wall areas adjacent thereto, whereby the leg(s) 12 flex or yield along said area 13 to cushion impact applied perpendicularly thereto along the direction of applied force illustrated in FIG. 1. The thinner weakened area(s) 13 can be extruded as such, or can be produced by drawing or stretching the area 13 while the extrusion is undergoing the heat treatment discussed hereinbefore. This latter embodiment produces an area 13 which is weakened both metallurgically and physically, namely by heat treatment resulting in a recrystallized structure, such as an aluminum alloy structure, and by reduced wall thickness.

Figure 3:
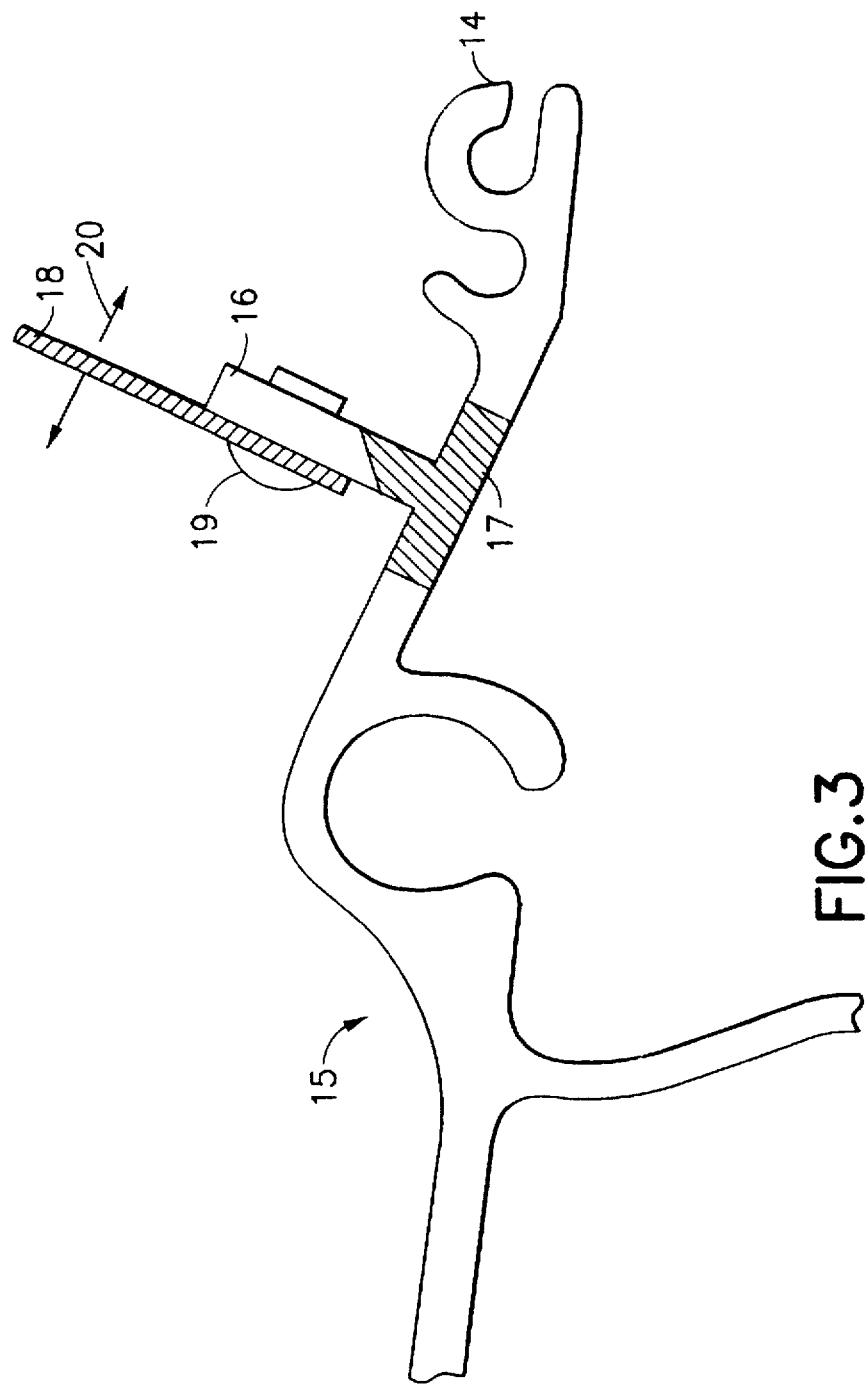

As illustrated by FIG. 3, the extruded metal airbag retainer 15 thereof is similar to the retainer 10 of FIGS. 1 and 2 but contains a transverse flange 16 which is integral with and a part of the heat-influenced, elongate weakened leg areas 17, and which is extruded as a flange, wall or lip which projects at an angle relative to the leg areas 17, such as substantially perpendicular thereto. The transverse flange 16 extends across the width of the retainer 15, as illustrated by area 13 of FIG. 1, and is sufficiently tall to permit attachment to a dashboard support member 18 such as a cross-car beam or an airbag module cover. FIG. 3 illustrates attachment by a series of spaced rivets 19 but other attachment means can also be used, such as screws or bolts, bonding cements, etc.

As illustrated by the arrows 20 in FIG. 3, an applied load, as may be caused by a collision which activates the airbag to inflation, causes the flange 16 to flex or deform rather than to break off or rupture, thereby minimizing damage to the vehicle and to the passengers.

For example a plastic airbag module cover 18 is forced out of position when the airbag is inflated. However the heat-softened, annealed or otherwise weakened integration of the flange 16, at area 17, permits the ductile flange 16 to flex or distort, without breaking away from the retainer 15, and thereby reduces damage to the airbag module cover and to the passengers.

It will be apparent to those skilled in the art that extruded airbag retainers vary in size, shape and design depending upon the size, shape and design of the dashboards within which they must be accommodated, and that the present invention can be applied to all such extruded airbag retainers having trough-shaped sidewalls with loading edges adjacent the dashboard surface in a location where they are likely to be impacted by a vehicle occupant.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An extruded airbag retainer capable of absorbing and cushioning the force of a passenger impact thereagainst, comprising a trough-shaped metallic sidewall section having opposed leg members, designed to contain an inflatable airbag and a gas generator for deployment at an activation impact, characterized by at least one of said opposed leg members being formed with a narrow transverse area of reduced strength to provide a localized line of weakness capable of yielding and deforming under the effects of impact pressure applied against the leading edge of said leg said narrow transverse area of reduced strength comprising a flange which projects from said leg member a sufficient height to permit attachment thereto of a support member.

2. An extruded airbag retainer according to claim 1 in which the width of said narrow transverse area is between about 3 and 4 mm.

3. An extruded airbag retainer according to claim 1 in which the narrow transverse area of reduced strength is one which is of reduced wall thickness.

4. An extruded airbag retainer according to claim 1 in which the narrow transverse area of reduced strength is one which is heat-treated to recrystallize the structure thereof.

5. An extruded airbag retainer according to claim 4 in which the heat-treated area is also reduced in wall thickness.

6. An extruded airbag retainer according to claim 1 which is extruded from an aluminum alloy.

7. An extruded airbag retainer according to claim 1 in which said narrow transverse area of reduced strength comprises a flange which projects from said leg member a sufficient height to permit attachment thereto of a support member.

* * * * *